United States Patent [19]

Chevion et al.

[11] Patent Number: 5,455,875
[45] Date of Patent: Oct. 3, 1995

[54] SYSTEM AND METHOD FOR CORRECTION OF OPTICAL CHARACTER RECOGNITION WITH DISPLAY OF IMAGE SEGMENTS ACCORDING TO CHARACTER DATA

[75] Inventors: Dan Chevion; Ittai Gilat; Andre Heilper; Oren Kagan; Amir Kolsky; Yoav Medan, all of Haifa; Eugene Walach, Kiryat Motzkin, all of Israel

[73] Assignee: International Business Machines Corporation, Armonk, N.Y.

[21] Appl. No.: 100,941

[22] Filed: Aug. 3, 1993

[30] Foreign Application Priority Data

Dec. 15, 1992 [GB] United Kingdom ............. 9226137

[51] Int. Cl.⁶ .................................................. G06K 9/03
[52] U.S. Cl. ................................................... 382/311
[58] Field of Search ............................. 382/57, 14, 9, 382/36, 39

[56] References Cited

U.S. PATENT DOCUMENTS

| | | | |
|---|---|---|---|
| 4,914,709 | 4/1990 | Rudak | 382/57 |
| 4,974,260 | 11/1990 | Rudak | 382/57 |
| 5,025,484 | 6/1991 | Yamanari et al. | 382/61 |
| 5,233,672 | 8/1993 | Yamanari et al. | 382/57 |
| 5,257,328 | 10/1993 | Shimizu | 382/61 |

FOREIGN PATENT DOCUMENTS

| | | | |
|---|---|---|---|
| 0107083 | 5/1984 | European Pat. Off. | G06K 9/03 |
| 63-208180 | 8/1988 | Japan | 382/57 |
| 4-294474 | 10/1992 | Japan | 382/57 |

OTHER PUBLICATIONS

Translation of Japanese Application No. 4-294474 to Koinumara, published Oct. 1992.
Translation of Japanese Application No. 63-208180 to Kawamata, published Aug., 1988.
Research Disclosure, #313, May, 1990, p. 383.
European Search Report, dated Jan. 3, 1995.

*Primary Examiner*—Leo H. Boudreau
*Assistant Examiner*—Andrew W. Johns
*Attorney, Agent, or Firm*—John D. Flynn; Joseph C. Redmond, Jr.

[57] ABSTRACT

A data entry system generates an electronically stored coded representation of a character sequence from one or more electronically stored document images. The system comprising optical character recognition logic for generating, from the document image or images, character data specifying one of a plurality of possible character values for corresponding segments of the document images. The system also has an interactive display means for generating and sequentially displaying, one or more types of composite image, each composite image comprising segments of the document image or images arranged according to the character data, and a correction mechanism responsive to a user input operation to enable the operator to correct the character data associated with displayed segments.

8 Claims, 4 Drawing Sheets

SYSTEM AND METHOD FOR CORRECTION OF OPTICAL CHARACTER RECOGNITION WITH DISPLAY OF IMAGE SEGMENTS ACCORDING TO CHARACTER DATA

FIELD OF THE INVENTION

The invention relates to a data entry system for the extraction of character information from scanned document images.

BACKGROUND OF THE INVENTION

With the advance of computerized data processing it has become common practice to generate information in electronic form via the automated recognition of information from scanned documents. In other words, data acquisition is performed as follows. First documents are scanned, then predetermined fields are extracted and passed to recognition modules for translation of an image into a coded form, such as ASCII.

However, despite the fact that this recognition can now be performed for both printed and hand-written data, almost always the recognition process results in a certain number of errors and rejects.

Hence, there remains a need for manual checking and correction of recognized data. This is generally performed by the display to a human operator of the scanned images and the associated optical character recognition results. The human operators perform comparison and correction where necessary.

Conventionally, there are two approaches to this process. Either an operator is asked to review all the fields and key-in errors and rejects discovered in the OCR process, or they are asked to view and correct only those fields where at least one error or reject has been discovered.

In both cases, the process is as follows. A problematic field is displayed on the screen with the recognition results being displayed in the vicinity of the image. Problematic characters are generally emphasized in some way, for instance the cursor may stop under the first problematic character or reversed video mode may be used to emphasize the problematic characters. The operator checks and if necessary corrects the emphasized characters and the process is repeated until all the problematic characters are resolved.

A major disadvantage of the prior art is that the fields are viewed by the operator in the context of the original document image. Assume the optical character recognition produces 5% of rejected characters and that each field has an average of 20 characters. In such a case about 35% of the fields will have at least one rejected character.

It follows that, in the prior art, in at least 35% of cases would the operator be required to display the field image, focus on it mentally, identify the problem and correct it. Thus prior art OCR assisted dam-entry methods improve the productivity of data entry by at most a factor of 3 over a purely manual data entry process.

SUMMARY OF THE INVENTION

The present invention is directed to a method and apparatus that satisfies these needs.

It is an object of the invention to reduce the intervention required for an operator to correct data entered by optical character recognition.

It is a further object of the invention to reduce the amount of time required by an operator to correct data entered by optical character recognition.

It is yet another object of the invention to increase the efficiency of OCR-assisted character data entry.

It is an object of the invention to reduce the time required to correct and complete the data entry of documents using an OCR process.

The foregoing and other objects of the invention are accomplished by an apparatus and method providing for a data entry system for generating an electronically stored coded representation of a character sequence from one or more electronically stored document images, comprising optical character recognition logic for generating, from the document image or images, character data specifying one of a plurality of possible character values for corresponding segments of the document images; characterized by interactive display apparatus comprising: means for generating and sequentially displaying, one or more types of composite image, each composite image comprising segments of the document image or images arranged according to the character data, and a correction mechanism responsive to a user input operation to enable the operator to correct the character data associated with displayed segments.

Preferably, the arrangement of the segments in one type of the composite images is into groups of segments for which the character data specifies the same character value. The displaying of composite images to the operator made up entirely of characters which have been recognized by the OCR logic as being of the same type enables errors to be rapidly recognized and marked on an exception basis. Once recognized, these errors can then be corrected either immediately or during correction of characters rejected by the OCR logic.

Where the character data comprises a confidence value associated with each specified character value, which confidence value is indicative of the likelihood that the specified character value is correct, the composite images can comprise segments having corresponding confidence value indicating a low such likelihood.

For extra speed, the segments can be arranged in groups of n segments in such composite images, the operator being able to set the confidence value of each of the n segments in a group to indicate a high likelihood that the character code be correct through a single user input operation.

If the documents being processed are such that the character codes are arranged in fields according to predetermined criteria, such as location on the document, the correction mechanism can advantageously comprise logic for generating one or more composite images comprising groups of segments of the document image associated with fields of the same type and displaying the composite images for correction by the operator. This enables correction of those few errors which can only be corrected in context.

In the present embodiment, the predetermined user input operation is actuation of a mouse at a time when a screen cursor is located over the displayed segment and the display of the composite images is via a video display unit, such as a cathode ray tube monitor.

Viewed from another aspect, the invention provides a method of operating data entry apparatus to generate an electronically stored coded representation of a character sequence from an electronically stored image of a document, the method comprising: generating character data specifying one of a plurality of possible character values for corresponding segments of the document images using optical character recognition logic; generating and sequentially displaying, one or more types of composite image from the character codes and the document image, each composite image comprising the segments of the document image arranged according to the character data; selecting segments of the document image displayed as part of the composite images; and correcting the character data corresponding to the selected segments to generate the coded representation.

In a particularly advantageous form of the invention, each of the document segments has a confidence value associated therewith indicative of the likelihood that the character code associated therewith be correct, and the character codes are arranged in fields each comprising one or more characters, the method comprises generating and sequentially displaying a plurality of composite images of a first type wherein the arrangement of the segments is into groups of segments for which the character data specifies the same character value; selecting segments displayed in the first type of composite image and setting the corresponding confidence value to indicate a low likelihood of the specified character value being correct; and generating and sequentially displaying a plurality of composite images of a second type comprising segments having a confidence value indicating a low likelihood associated therewith; selecting segments of the document image displayed as part of the composite images of the second type; and correcting the character data corresponding to the selected segments to generate the coded representation.

To correct any remaining errors the method can comprise generating and sequentially displaying a plurality of composite images of a third type comprising groups of segments associated with fields having the same type value associated therewith; selecting segments of the document image displayed as part of the composite images of the third type; and correcting the character data corresponding to the selected segments to generate the coded representation.

BRIEF DESCRIPTION OF THE DRAWING

These and other objects, features, aspects, and advantages of the present invention will become better understood with regard to the following description, appended claims and accompanying drawings where:

DETAILED DESCRIPTION OF THE INVENTION

Figure 1:
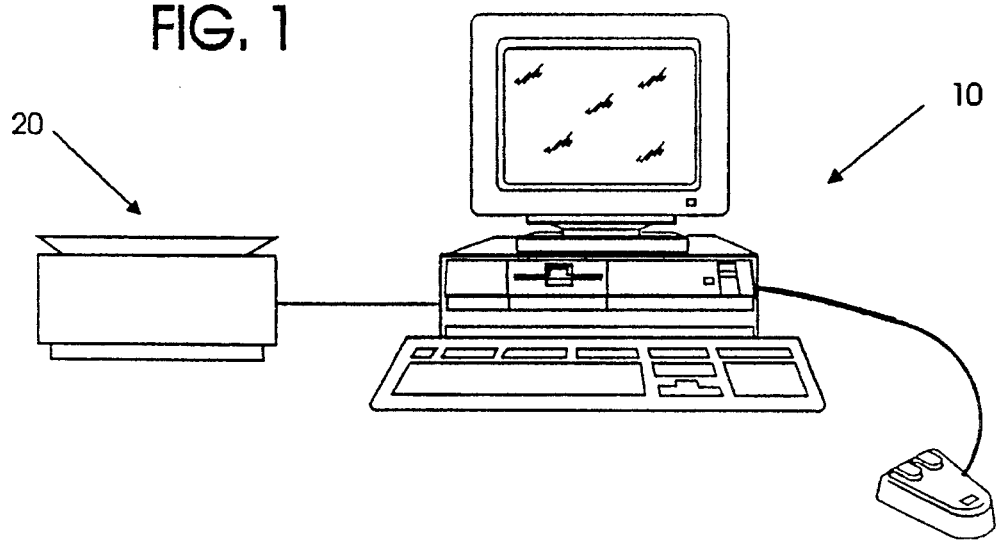
FIG. 1 shows the apparatus used in one embodiment.
Figure 2:
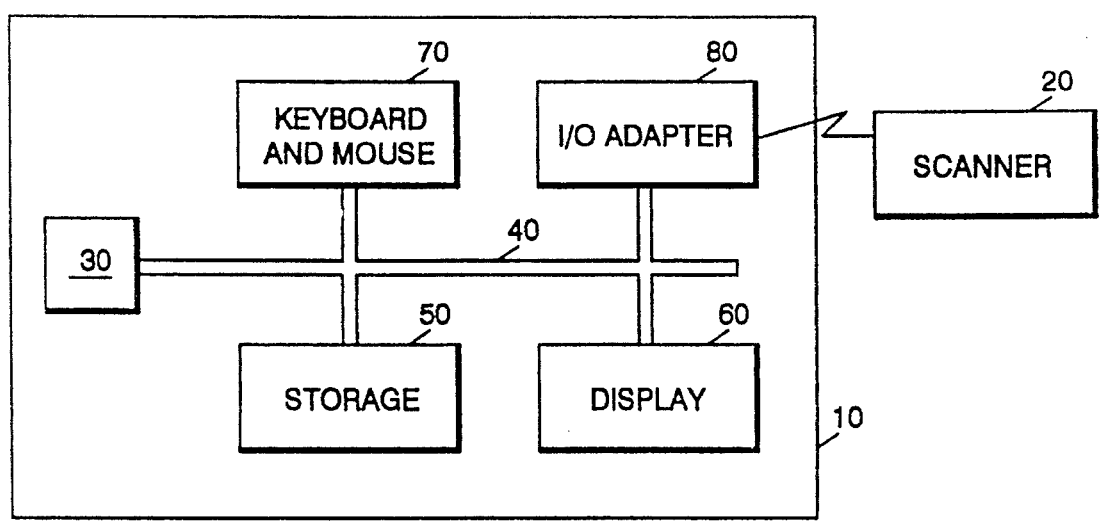
FIG. 2 is a schematic view of the apparatus of FIG. 1.

An embodiment of the invention will now be described, by way of example only, with reference to the accompanying drawings. The data entry system of the present embodiment of the invention is shown generally in FIG. 1. It comprises a personal computer 10 which is connected to a scanning device 20. FIG. 2 is a schematic diagram showing the relevant parts of computer 10 and scanner 20. Processor 30 is connected via bus 40 to disk storage device 50, cathode ray tube display device 60, user input devices—keyboard and mouse—shown generally at 70. Processor 30 is connected via bus 40 and input/output adapter 80 to scanning device 20.

Scanning device 20 is a conventional device of a type well known in the art. It is used to scan document pages placed therein and pass digitized images thereof to computer 10 which are stored in storage device 50. The image is digitized in scanner 20 by measuring the brightness of light reflected from small rectangular areas of the pages, the areas being arranged in rows and columns to cover the whole page, and comparing the brightness levels corresponding to each area with a threshold parameter. In the digitized image produced by the scanner, pels above the threshold are set to 1 and pels below set to 0.

Stored document images are processed to generate a sequence of coded character dam, which contains the character information extracted from the document images but which is in a form, such as ASCII, which is easier to store and manipulate in the computer.

Figure 3:
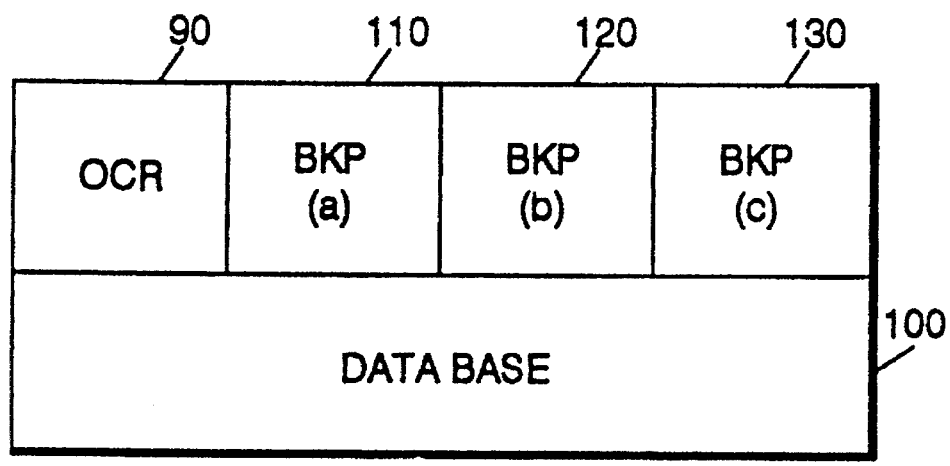
FIG. 3 is a schematic diagram of the software elements used.

FIG. 3 is a schematic diagram showing the software elements used in this present embodiment. OCR logic 90 takes the document images as input and generates a sequence of character codes and associated confidence values which are stored along with the segmented character images in database 100. Database 100 contains and manages the following information for each document:

1. The document image.

2. An image of the all the segmented characters that were processed by the OCR logic 90.

3. A record of the recognition results (i.e., the character codes and confidence values).

4. A form definition file which contains the information from which the location of each character and OCR result can be computed. This is actually a list of field names with their geometric location on the form, their type (i.e., numeral, alpha, etc.) and the number of characters in the field.

Basic Key-in Process (BKP) modules 110, 120 and 130 extract and modify the database data as will be described below.

The data entry process is generally comprised of the following five stages:

1. The document images comprise a number of fields each corresponding to a particular predetermined area of the document image. Each field to be recognized is segmented into images of individual characters to be recognized.

2. The individual characters are fed into OCR logic 90 which either recognizes the characters, possibly with errors, or rejects them. Many methods of optical character recognition are well known in the art and the details of the operation of the character recognition logic need not be described further herein. The OCR logic 90 generates for each character image a character code and a confidence value. Those characters generated with a low confidence value are considered rejected.

3. Images of individual characters are pasted together to form composite mosaic images suitable for optimal operator productivity. Thus characters are merged from different fields and even different documents into the composite images.

4. The character codes associated with these composite images are corrected by an operator in a key-in session.

5. Dam entry results are recast into their proper sequence within the original document for final processing.

The success of the process depends on being able to achieve higher operator productivity for the correction of the composite images than for the display of the individual characters in the context of the document itself.

In the present embodiment three different types of composite image are used in different stages of the correction process. These types of composite image have been designated by the inventors as follows: Exemption Data Entry, Memory Span Data Entry and Field Type Data Entry. Each is discussed below.

Exemption Data Entry

The characters are extracted, sorted and displayed in composite images according to the recognition results. All the characters recognized with a particular value of the character code are grouped together in the composite images (i.e., the images of all the characters recognized as '1's are displayed together as a composite image, likewise the images of all the characters recognized as '2's and so on).

These results are verified for correctness by the operator. Errors are marked using a pointing device (i.e., by moving the cursor onto the incorrect image and clicking the mouse), and tagged as rejects. Using this method all OCR errors can be tagged.

Memory Span Data Entry

A composite image is formed composed of n rejected character images displayed on the screen simultaneously. The rejected character images can either be rejected by the OCR engine (i.e., recognized with a low confidence value) or they can have been tagged as errors by the exemption data entry procedure.

The operator can then manually correct these images. The parameter n is chosen so that the display screen format is easy for an operator to grasp to maximize data entry speed. It has been found by the inventors that a value of n=3 is optimal. However, this number is adjustable by the operator according to their preferences.

It is advantageous to perform this memory span data entry of data sorted according to the OCR results so that the fields can be corrected by the exemption data entry and it is easy to identify those sets of rejected characters where no correction is required. If 80% of the characters recognized by the OCR with a low confidence level are actually correct, then for n=3, in 50% of the sets the OCR results will be correct and a single keystroke will be required to accept the entire set.

Field Type Data Entry

A few errors can only be corrected by an operator in their context. This type of data entry is designed to handle these errors. Characters are grouped into fields of the same type and the operator can use the information they have about the field-type to assist in correcting the error. For example in a given batch of documents, all the dates are grouped together, all the names are grouped together and so on. As a result it is easier for an operator to concentrate on a certain constant mode of operation. Moreover there is an increased chance of similarity between fields, for example if many documents were generated on the stone date it is easy to fill in this date on all the fields of this type and then only exceptions need to be corrected.

In the method of operation used in the present embodiment, these three types of data entry are combined in an advantageous way as follows.

1. OCR operates on all characters. Some characters may be rejected by this process.

2. Recognized characters are reviewed using the exemption data entry technique. In this way all OCR errors are detected and tagged.

3. Rejected characters and those tagged as errors are corrected using the memory span data entry sorted into fields of the same character type.

4. The few remaining characters which could not be corrected by step 3 are corrected in context by the field-type data entry.

Figure 4:
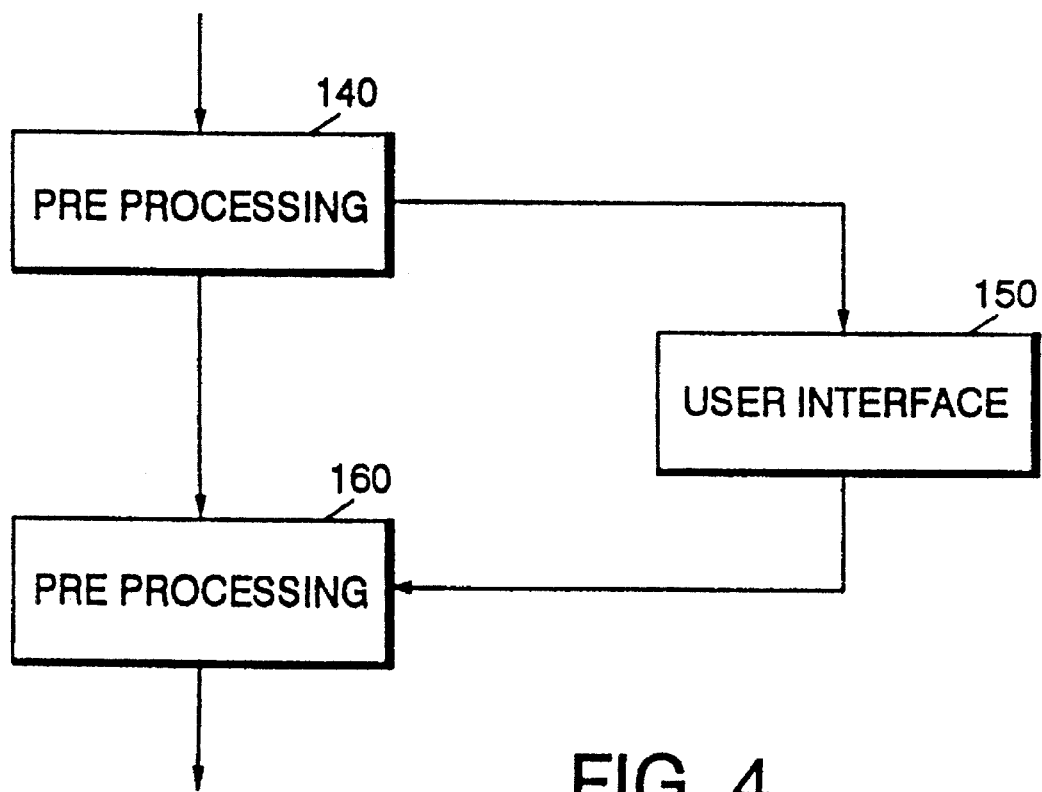
FIG. 4 shows a basic key-in process module.

The structure of each BKP module is shown in FIG. 4. They comprise the following three modules:

1. Pre-processing module 140. This module takes the set of document images and rearranges the characters in all these documents according to some input rules. It is a data base query processing module which interrogates the data base 100 of document images and OCR results, and the result of a query is a set of composite images consisting of characters of the database which answer the query. The queries accepted by this module are:

a. "Take all characters recognized as 'x' with high confidence, and arrange them in a mosaic" ('x' is some character). In this case, the result of this query would be all the characters in the set which were recognized as 'x' arranged in a set of images, each of which is a matrix of character images. The characters in the mosaic would eventually be all mixed up, each coming from one form or another, but all were recognized as 'x'. This query refers to the "key-in by exemption" method described above.

b. "Take all characters recognized with low confidence, and arrange them in a mosaic". In this case, each composite image consists of n characters, where n is a parameter which can be set by the user. This query refers to the "key-in by memory span" method described above.

c. "Take all fields labelled 11, 12, 13, . . . , and arrange them in a mosaic", wherein is a symbolic name of a specific field in the form. In this case, the composite image consists of a full field. "Take all fields representing a year" is an example of such a query, which results in mosaics consisting of fields representing years (year of birth, year of current date, etc). This query refers to the "key-in according to the field type" method described above.

The output of preprocessing module 140 comprises the following elements:

a. the composite images.

b. the corresponding OCR results, arranged according to the mosaics.

c. pointers back to the data base for enabling its update, once the correct recognition value for each character in the mosaics has been obtained. These pointers are generated in a file containing this information, (i.e., for each character in the mosaic, from which document, and which character in that document it was taken). For example, if a key-in by exemption mosaic is generated, the character in location ij in the mosaic is the k'th character in field m in document n.

2. Key-in user interface 150. This module receives the pre-processing module's output as input and, after a key-in session, generates a set of key-in results for the mosaics. User interface 150 is a Graphical User Interface which displays the composite image to be keyed-in and which provides data entry boxes for entering the key-in data, a data entry box for each element in the mosaic. The key-in results have exactly the same format as the OCR results.

3. Post-processor 160 which takes as input the key-in results and the pointer file and updates the recognition results of the initial forms data base according to the key-in results. These three modules are connected to each other according to FIG. 4.

4. The pre-processing module 140 generates the mosaics, and a set of pointers back to the data base. From these, the key-in user interface 150 generates a set of keyed-in results. These are passed to the post-processing module 160 and the OCR records are updated using the pointer file from the pre-processing module.

Figure 5:
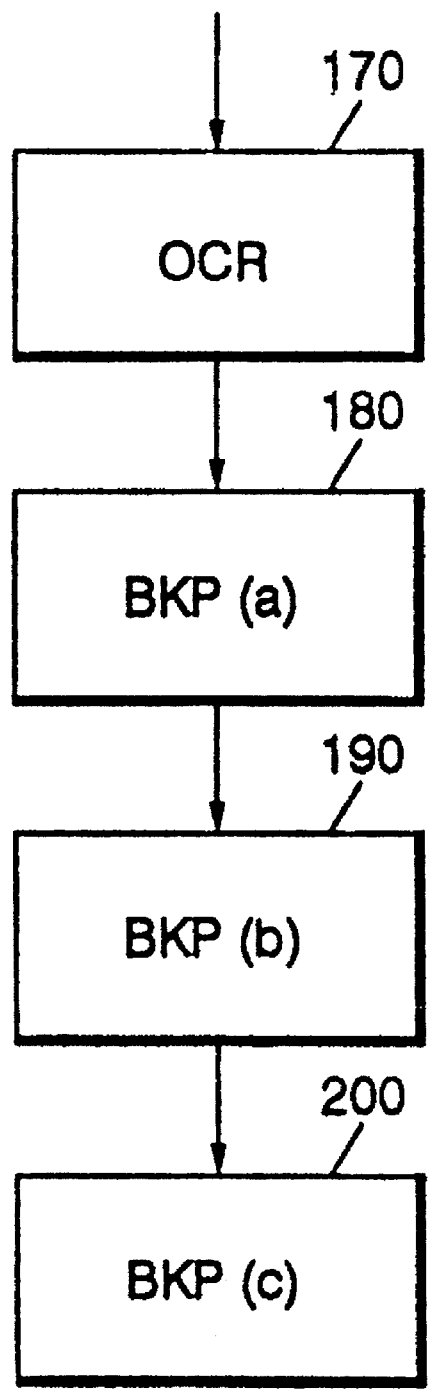
FIG. 5 is a flow chart showing the sequence of operation.
Figure 6:
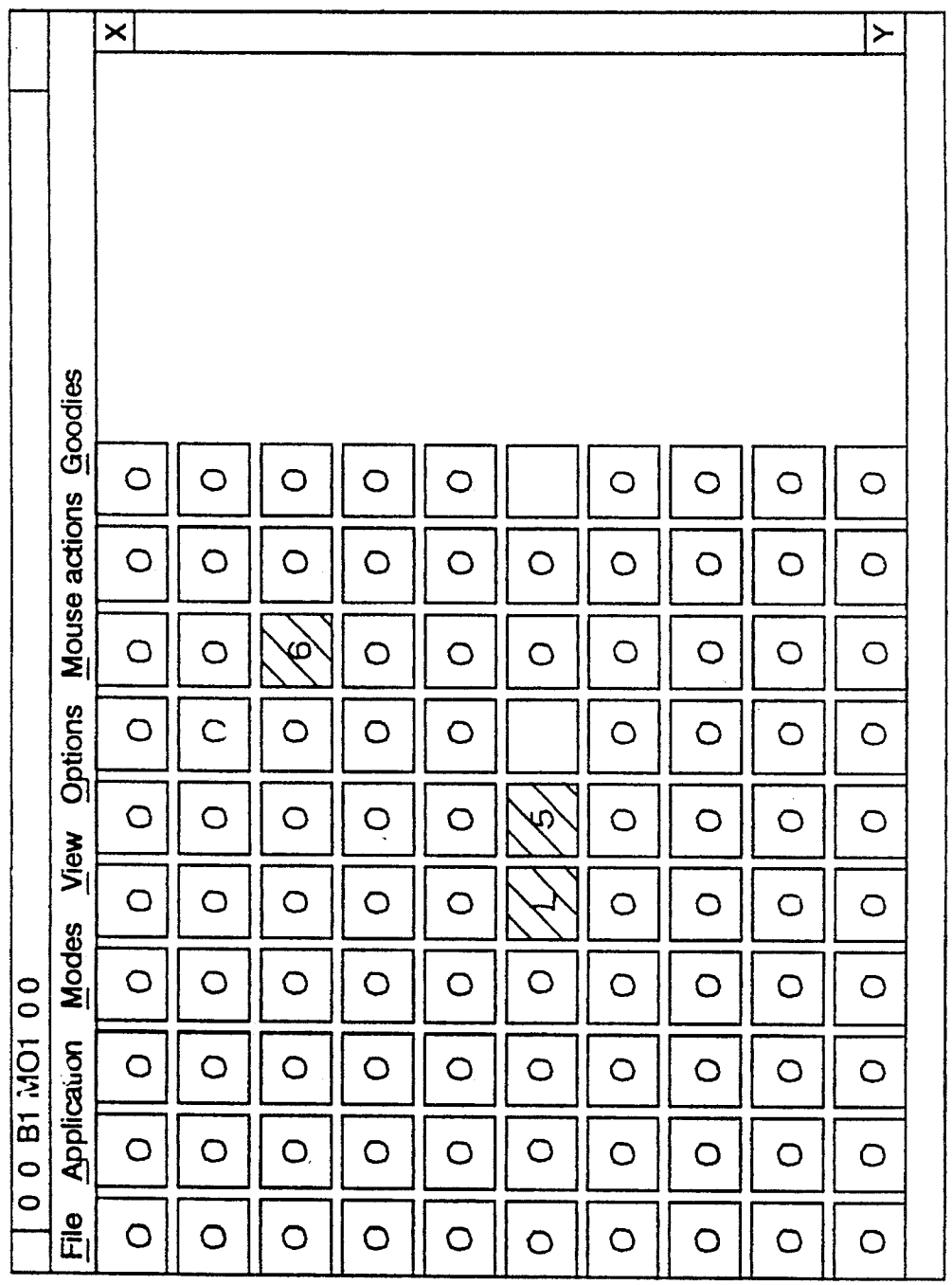
FIG. 6 shows an example of a composite image.

Three different BKP's 110, 120, 130 are constructed using the pre-processing modes described in 1a, 1b, and 1c and connected as described in the flow chart of FIG. 5. After processing 170 by the OCR logic, BKP with key-in by exemption is performed 180 so that in the data base 100 all characters having high OCR confidence which were actually found to have a wrong OCR result are set to low confidence (i.e., tagged as rejects). FIG. 6 shows an example of a composite image produced during key-in by exemption. The composite image comprises all the characters which have been recognized as the letter 'O' by the OCR. Errors have been identified and marked in this example, as shaded segments.

Next, BKP with key-in by memory span is performed 190 so that in data base 100 all characters having low confidence are corrected as far as possible. Finally, BKP with key-in by field type is performed 200 to correct those few errors which need to be corrected in context to generate a correct data base.

The present embodiment has been described in terms of a suitably programmed general purpose computer used in conjunction with a conventional scanning device but, in practice, it will be understood that the invention could be implemented in hardware, either as part of the scanner or as a special purpose adapter for use with the computer or a stand alone hardware device or be implemented as any combination of hardware and software.

It will be appreciated that may variations of the apparatus and methods describe here are possible within the scope of the attached claims. The methods described here could work with a wide variety of supplementary modules for field extraction, OCR of either printed or handwritten data, character segmentation, image display and key-in.

The interactive display apparatus could take many forms. For example the composite images could be displayed by being printed using a printing device. The operator could then mark errors on the printed sheets and feed the marked sheets into a scanning apparatus which would detect the location of the marked errors and update the character data accordingly. Alternatively, the location of the errors on the printed copy could be keyed-in by hand.

The inventors have used and tested their apparatus for the extraction of data from hand printed filled-in forms and for the recognition of addresses from digitized address labels in the context of automated mail sorting, However, it will be understood there may be wide variation in the types of data to be keyed-in.

In the described present embodiment the OCR logic associates a low confidence value with a rejected character, some OCR methods provide a second best character code, which was recognized with the next highest confidence value. This information could be used in the correction mechanism in order to speed up the data entry process by presenting the second choice to the user and enabling them to accept or reject this with a single key-stroke.

Various other logical tests may be applied to fields such as dates, checksums and other code sums. Also, values that exist in databases or dictionaries, such as ID numbers, can be verified for validity. These tests can improve both the speed and quality of the data entry process and eliminate manual intervention. Accordingly, they may be used before and after each of the above data entry stages as an automatic error correction/detection mechanism.

For applications where accuracy is of paramount importance, the method can be used as part of a double pass process. Results of data entry using this present method would be compared with results obtained via manual data entry, with any differences being pointed out to and corrected by an operator.

The following is an approximate analysis, provided for the purposes of illustration only, of the performance improvement which can potentially be achieved using the present approach.

Assume that a given recognition package rejects 5% of characters and accepts the remainder, with 1% substitution error and that 10,000 documents having 20 characters in a single field have to be keyed-in and that the operator's productivity is 10,000 key-strokes per hour, yielding an average of 1s for correction of each field. Using manual data entry 200,000 character have to be keyed-in using a double pass. Each pass requires 20 hours of operator time, yielding a total of 40 hours operator time. Using the prior art OCR assisted data entry all data would need to be reviewed manually to pick up the 1% substitution errors from the OCR. Assuming a first pass of OCR assisted data entry with correction of fields containing rejected characters, followed by a second manual pass of all the data, 65%=100%× (1−0.9520) of fields must be viewed in the first pass. Since we have assumed 1s for the correction of each field, this would take 10,000 docs×0.65×1s=1.8 hrs. The second manual pass would take 20 hours as above and thus the total time would be 21.8 hours.

Using the present technique starting with exemption data entry of all recognized characters (200,000×0.95=190,000 characters) if each composite image contains 80 characters and is processed in 1s 190,000/80=2,375 screens are needed taking 0.66 hours. As a result of this 1% (1900) of characters are tagged as rejected. These characters are added to the 10,000 recognition rejects to yield a total of 11,900 characters which need correction using memory span data entry. This would require 11,900/10,000=1.19 hours. Therefore the total operator time is 0.66+1.19=1.85 hours.

It can thus be seen that the invention provides a dramatic improvement over both the double pass fully manual data entry and the double pass OCR assisted data entry, both of which may be expected to produce an equivalent precision level.

While the present invention has been described with reference to structures disclosed herein, it is not confined to the details set forth and this disclosure is intended to cover such modifications or changes as may come within the purposes of the improvements or the scope of the following claims.

What is claimed is:

1. A data entry system for generating an electronically stored coded representation of a character sequence from one or more electronically stored document images, comprising:

an optical character recognition logic means for generating, from a document image and storing in a data base, character data specifying one of a plurality of possible character values for corresponding segments of the document image;

the optical character recognition means generating a high or low confidence factor for each character;

preprocessing means for generating composite images of possible character values for corresponding segments of a plurality of document images and pointers to characters in the data base for updating such character data;

the preprocessing means arranging the segments in one type of the composite images which consists of groups of segments for which the character data specifies the same character value and has a high confidence factor;

an interactive display means for generating and sequentially displaying, one or more types of composite images, each composite image comprising segments of the document image arranged according to like character data;

the interactive display means having a correction mechanism responsive to a user input operation to enable the operator to correct the character data associated with the displayed segments; and post processing means for updating character data in the data base corrected by the operator using the pointer for the character data in the data base.

2. The data entry system in claim 1 wherein each character data has a confidence value associated with each specified character value, where the confidence value is indicative of the likelihood that the specified character value is correct, wherein the composite images comprise segments having corresponding confidence value indicating a low such likelihood.

3. The data entry system in claim 2 wherein the segments are arranged in groups of n segments, wherein the correction mechanism enables the operator to set the confidence value of each of the n segments in a group to indicate a high likelihood that the character code is correct through a single user input operation.

4. The data entry system in claim 3 wherein the character data are arranged in fields each comprising one or more characters, the character data comprising a type value associated with each field, and wherein one type of the composite images comprise groups of segments associated with fields having the same type value associated therewith.

5. The data entry system in claim 4 wherein the predetermined user input operation is actuation of a mouse at a time when a screen cursor is located over the displayed segment.

6. The Data entry system in claim 5 wherein the display of the composite images is via a video display unit.

7. A method of operating a data entry apparatus to generate an electronically stored coded representation of a character sequence from an electronically stored image of a document, the method comprising the steps:

generating in optical character means character data specifying one of a plurality of possible character values for corresponding segments of the document images using optical character recognition logic;

the character data comprising a confidence value for each specified character value, the confidence value being indicative of the likelihood that the character code associated therewith is correct, the method further comprised in the steps:

storing the character data and generating a pointer to the character data in a data base;

generating and sequentially displaying, one or more types of composite images from the character values and the document image in a preprocessing module, each composite image comprising the segments of the document image arranged according to the character data;

generating and sequentially displaying a plurality of composite images of a first or exemption data entry type wherein the arrangement of the segments is into groups of segments for which the character data specifies the same character value;

selecting segments displayed in the first type of composite image and setting the corresponding confidence value to indicate a high likelihood of the specified character value being correct;

generating and sequentially displaying a plurality of composite images of a second or memory span data entry type comprising segments having a confidence value indicating a low likelihood associated therewith;

selecting segments of the document image displayed as part of the composite images of the second type;

correcting the character data corresponding to the selected segments to generate the coded representation; and updating the character data in the data base using the corrected character data and the pointer to the character data.

8. The method of claim 7 in which the character data is arranged in fields each comprising a one or more characters and comprises a type value associated with each field, which type value can take one of a plurality of values, the method further comprising:

generating and sequentially displaying a plurality of composite images of a third or field data entry type comprising groups of segments associated with fields having the same type value associated therewith;

selecting segments of the document image displayed as part of the composite images of the third type; and correcting the character data corresponding to the selected segments to generate the coded representation.

\* \* \* \* \*